(12) United States Patent
Jeon et al.

(10) Patent No.: US 11,787,941 B2
(45) Date of Patent: Oct. 17, 2023

(54) POLYIMIDE-BASED FILM AND FLEXIBLE DISPLAY PANEL INCLUDING THE SAME

(71) Applicants: SK Innovation Co., Ltd., Seoul (KR); SK IE Technology Co., Ltd., Seoul (KR)

(72) Inventors: Seung Min Jeon, Daejeon (KR); Min Sang Park, Daejeon (KR); Je Seung Park, Daejeon (KR); Yeong Min Jo, Daejeon (KR)

(73) Assignees: SK Innovation Co., Ltd., Seoul (KR); SK ie technology Co., Ltd., Seoul (KR)

( * ) Notice: Subject to any disclaimer, the term of this patent is extended or adjusted under 35 U.S.C. 154(b) by 267 days.

(21) Appl. No.: 17/034,278

(22) Filed: Sep. 28, 2020

(65) Prior Publication Data

US 2021/0095120 A1    Apr. 1, 2021

(30) Foreign Application Priority Data

Sep. 30, 2019   (KR) .................. 10-2019-0120684

(51) Int. Cl.
| | | |
|---|---|---|
| *C08L 79/08* | (2006.01) | |
| *C08G 73/10* | (2006.01) | |
| *C08G 73/14* | (2006.01) | |

(52) U.S. Cl.
CPC .......... *C08L 79/08* (2013.01); *C08G 73/1039* (2013.01); *C08G 73/1067* (2013.01); *C08G 73/1078* (2013.01); *C08G 73/14* (2013.01); *C08L 2201/10* (2013.01); *C08L 2203/16* (2013.01); *C08L 2203/206* (2013.01)

(58) Field of Classification Search
CPC ......... C08L 79/08; C08G 73/14; C08G 73/01; C08J 2379/08; C08J 2479/08
See application file for complete search history.

(56) References Cited

U.S. PATENT DOCUMENTS

| | | | |
|---|---|---|---|
| 8,075,824 B2 | 12/2011 | Yoshinaga et al. | |
| 9,676,960 B2 | 6/2017 | Kim et al. | |
| 10,280,336 B2 | 5/2019 | Shin et al. | |
| 10,591,761 B2 | 3/2020 | Jee et al. | |
| 2016/0024348 A1 | 1/2016 | Kim et al. | |
| 2018/0355108 A1* | 12/2018 | Jo .................. | C09D 179/08 |
| 2019/0077960 A1 | 3/2019 | Kim et al. | |
| 2019/0256658 A1 | 8/2019 | Olde et al. | |

FOREIGN PATENT DOCUMENTS

| | | |
|---|---|---|
| JP | 200355487 A | 2/2003 |
| JP | 3592018 B2 | 11/2004 |
| JP | 2006253185 A | 9/2006 |
| JP | 2008127471 A | 6/2008 |
| JP | 2008291085 A | 12/2008 |
| JP | 201747684 A | 3/2017 |
| JP | 201865259 A | 4/2018 |
| KR | 1020070066989 A | 6/2007 |
| KR | 1020090036130 A | 4/2009 |
| KR | 1020150104282 A | 9/2015 |
| KR | 1020150113916 A | 10/2015 |
| KR | 1020160013402 A | 2/2016 |
| KR | 1020160020615 A | 2/2016 |
| KR | 1020160077694 A | 7/2016 |
| KR | 101831598 * | 10/2016 |
| KR | 1020180018307 A | 2/2018 |
| KR | 101839293 B1 | 3/2018 |
| KR | 1020180044216 A | 5/2018 |
| KR | 101922169 B1 | 11/2018 |
| KR | 1020190029110 A | 3/2019 |
| KR | 1020190029790 A | 3/2019 |
| KR | 1020190090300 A | 8/2019 |

\* cited by examiner

*Primary Examiner* — Gregory Listvoyb
(74) *Attorney, Agent, or Firm* — THE WEBB LAW FIRM (57) ABSTRACT

Provided are a polyimide-based film, a window cover film, and a display device including the same. More specifically, a polyimide-based film having different surface energies from each other on both surfaces, a window cover film having excellent optical properties such as a visibility, and a display panel including the same are provided.

12 Claims, 1 Drawing Sheet

POLYIMIDE-BASED FILM AND FLEXIBLE DISPLAY PANEL INCLUDING THE SAME

CROSS-REFERENCE TO RELATED APPLICATION

This application claims priority to Korean Patent Application No. 10-2019-0120684 filed Sep. 30, 2019, the disclosure of which is incorporated herein by reference in its entirety.

TECHNICAL FIELD

The following disclosure relates to a polyimide-based film, a window cover film, and a display panel including the same. More particularly, the following disclosure relates to a polyimide-based film having different surface energies from each other on both surfaces, a window cover film having excellent optical properties such as a visibility, and a display panel including the same.

BACKGROUND

Display devices are provided with a window cover which is configured to be transparent on a display panel so that a user may see a display unit from a front of the display panel, in order to protect the display panel from scratches or external shock.

Since display devices gradually become light-weight, thinner, and flexible, a window cover manufactured from a polymer film having high hardness, high stiffness, and flexibility properties is studied a lot, instead of tempered glass.

Since the window cover is a constituent formed in the outermost part of the display device, it is important for the window cover to have high display quality and not to cause distortion by light such as a Mura phenomenon, a blackout phenomenon in which a screen looks black at a certain angle, or a rainbow phenomenon having iridescent stains.

In particular, in the window cover, a functional coating layer is laminated on a transparent film for imparting various physical properties, and poor adhesiveness between the transparent film and a coating layer or non-uniform adhesion may occur, diffuse reflection of light may be caused, optical stains may occur to worsen a visibility, and eye strain may be caused when the window cover is applied.

Therefore, a study to improve adhesiveness between the transparent film and the coating layer is needed, and for this, a transparent film having good affinity with various solvents used in a composition for forming various coating layers is demanded.

RELATED ART DOCUMENTS

Patent Documents (Patent Document 1) Korean Patent Laid-Open Publication. No. 10-2015-0104282 No. (Sep. 15, 2015)

SUMMARY

An embodiment of the present invention is directed to providing a polyimide-based film having different surface energies from each other on both surfaces, thereby providing the polyimide-based film which may have a wider range of selection of a solvent regardless of the kind of solvent, in a post-coating process of applying a composition including a solvent for applying various functional layers such as a hard coating layer, an anti-fingerprint layer, an anti-scratch layer, and an antireflective layer.

In addition, a polyimide-based film having excellent optical properties is intended to be provided.

Usually, in the case in which a coating composition has a low affinity with a polyimide-based film which is a transparent film, when a surface of a substrate is coated, peeling may occur or the surface may not be uniformly coated. However, in the present invention, the polyimide-based film, which is produced so that both the surfaces of the polyimide film have different surface energies from each other, whereby a surface having a higher affinity with a solvent of a coating composition is selectively coated to allow prevention of peeling or uniform application to have a wider range of selection of a coating composition or a solvent of the coating composition, is intended to be provided.

Another embodiment of the present invention is directed to providing a novel optical polyimide-based film having excellent mechanical physical properties or optical physical properties and solving optical defects such as a rainbow phenomenon or a mura phenomenon by using a polyamideimide-based resin having a specific structure as a material and adjusting a surface energy difference between both the surfaces of the film to a specific range.

Still another embodiment of the present invention is directed to providing a window cover film having an improved visibility.

In one general aspect, a polyimide-based film having different surface energies from each other on both surfaces is provided, wherein when a surface energy of a first surface having a relatively lower surface energy is A, and a surface energy of a second surface having a relatively higher surface energy is B, the following equation is satisfied:

$$B/A \geq 1.3 \qquad \text{[Equation 1]}$$

In an exemplary embodiment of the present invention, in Equation 1, B/A may be 1.5 or more.

In an exemplary embodiment of the present invention, the surface energy A of the first surface may be 20 to 30 mN/m and the surface energy B of the second surface may be 30 to 50 mN/m.

In an exemplary embodiment of the present invention, the polyimide-based film may be produced by a solution casting method, the first surface of both the surfaces may be in contact with air during the solution casting, and the second surface may be a surface in contact with a substrate.

In an exemplary embodiment of the present invention, a surface energy difference between the first surface and the second surface may be adjusted by adjusting a surface roughness (Ra) of the substrate so that the surface energies of the first surface and the second surface are different.

In an exemplary embodiment of the present invention, the surface roughness of the substrate may be adjusted to 0.02 μm or less to adjust the surface roughness of the second surface to 0.02 μm or less.

In an exemplary embodiment of the present invention, the polyimide-based film may have a modulus in accordance with ASTM D882 of 3 Gpa or more, an elongation at break of 8% or more, a light transmittance of 5% or more as measured at 388 nm in accordance with ASTM D1746, a total light transmittance of 87% or more as measured at 400 to 700 nm, a haze of 2.0% or less, a yellow index of 5.0 or less, and a b* value of 2.0 or less.

In an exemplary embodiment of the present invention, the polyimide-based film may have a polyamideimide structure.

In an exemplary embodiment of the present invention, the polyimide-based film may include a unit derived from a fluorine-based aromatic diamine, a unit derived from an aromatic dianhydride, and a unit derived from an aromatic diacid dichloride.

In an exemplary embodiment of the present invention, the polyimide film may further include a unit derived from a cycloaliphatic dianhydride.

In an exemplary embodiment of the present invention, the polyimide-based film may have a thickness of 30 to 110 μm.

In another general aspect, a window cover film includes: the polyimide-based film according to the exemplary embodiment; and a coating layer formed on one surface or both surface of the polyimide-based film.

In an exemplary embodiment of the present invention, the coating layer may be any one or more selected from a hard coating layer, an antistatic layer, an anti-fingerprint layer, an antifouling layer, an anti-scratch layer, a low-refractive layer, an antireflective layer, and shock absorption layer.

In still another general aspect, a flexible display panel includes the polyimide-based film according to the exemplary embodiment.

Other features and aspects will be apparent from the following detailed description, the drawings, and the claims.

DETAILED DESCRIPTION OF MAIN ELEMENTS

10: polyimide-based film
11: first surface
12: second surface

DETAILED DESCRIPTION OF EMBODIMENTS

Hereinafter, the present invention will be described in more detail with reference to specific examples and exemplary embodiments including the accompanying drawings. However, the following specific examples or exemplary embodiments are only a reference for describing the present invention in detail, and the present invention is not limited thereto, and may be implemented in various forms.

In addition, unless otherwise defined, all technical terms and scientific terms have the same meanings as those commonly understood by a person skilled in the art to which the present invention pertains. The terms used in the description of the invention are only for effectively describing a certain specific example, and are not intended to limit the present invention.

In addition, the singular form used in the specification and claims appended thereto may be intended to also include a plural form, unless otherwise indicated in the context.

In addition, unless particularly described to the contrary, "comprising" any elements will be understood to imply further inclusion of other elements rather than the exclusion of any other elements.

In the present invention, a polyimide-based resin is used as a term including polyimide or polyamideimide. A polyimide-based film is used likewise.

In the present invention, a "polyamic acid solution" is used in the same meaning as a "polyamic acid resin composition".

In the present invention, a "polyimide-based resin solution" is used in the same meaning as a "composition for forming a polyimide-based film" and a "polyamideimide solution". In addition, a polyimide-based resin and a solvent may be included for forming the polyimide-based film.

In the present invention, a "film" is obtained by applying and drying the "polyimide-based resin solution" on a substrate and carrying out peeling off, and may be stretched or unstretched.

In the present invention "one surface" may mean any one surface of the polyimide-based film, a first surface may mean an upper surface and a second surface may mean a lower surface.

In the present invention, "curl" and "curling" may mean bending-deformation of a film, a "curl amount" may mean a vertical height from the lowest point of the film to a point where the film is bent and rises, when a curled film is placed on a plane.

The term, "anti-curling property" used in the present specification may refer to a characteristic of exhibiting the "curl amount" less.

A "dynamic bending property" in the present invention may mean that even when a hard coating film is repeatedly deformed (for example, folded and unfolded), permanent deformation and/or damage does/do not occur in a deformed part (for example, a folded part).

A "surface energy" in the present invention was calculated by using equipment from KRUSS (KRUSS DSA100S), deriving a contact value when applying water by a sessile drop method and a contact value when applying diiodomethane as an average value of three, and applying the value to the following equation using an OWRK method.

$$\sigma_{st} = \sigma_s + \sigma_t - 2(\sqrt{\sigma_s^D \cdot \sigma_t^D} + \sqrt{\sigma_s^P \cdot \sigma_t^P})$$

As a result of conducting many studies for solving the above problems, the inventors of the present invention found that a polyimide-based film having different surface energies from each other on both the surfaces of the polyimide-based film is provided, thereby having a wide range of selection of a solvent regardless of the kind of solvent in a post-coating process, and thus, forming a coating layer in various embodiments, and thus, has completed the present invention. That is, having different surface energies from each other on both the surfaces in the present invention means having different solubilities in a solvent from each other.

In addition, the inventors of the present invention found that the surface energy difference between both the surfaces of the polyimide-based film is in a specific range, thereby providing a polyimide-based film having further improved optical physical properties, that is, optical defects such as a rainbow phenomenon or a mura phenomenon, and thus, have completed the present invention.

Hereinafter, each constituent element of the present invention will be described in detail. However, these are only illustrative and the present invention is not limited to the specific embodiments which are illustratively described by the present invention.

Figure 1:
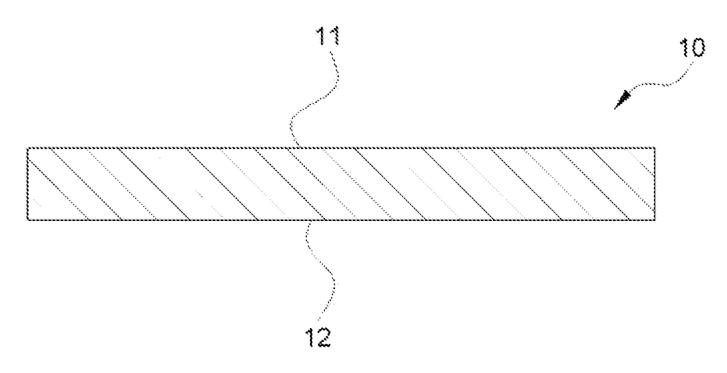
FIG. 1 illustrates a polyimide-based film according to an exemplary embodiment of the present invention.

FIG. 1 is a schematic drawing illustrating a polyimide coating film according to exemplary embodiments of the present invention.

Referring to FIG. 1, a polyimide-based film 10 according to an exemplary embodiment of the present invention includes a first surface 11 and a second surface 12, the first surface and the second surface mean surfaces of the film, and the first surface and the second surface have different surface energies from each other.

Specifically, the surface energy of the first surface may be relatively low and the surface energy of the second surface may be relatively high. More specifically, for example, the polyimide-based film may be produced by a solution casting method, the first surface may be in contact with air during the solution casting, and the second surface may be a surface in contact with a substrate.

<Polyimide-Based Film>

In an exemplary embodiment of the present invention, the polyimide-based film is characterized in that when the surface energy of a first surface and a surface energy of a second surface are different from each other, and a surface energy of the first surface having a relatively low surface energy is A and a surface energy of the second surface having a relatively high surface energy is B, the following equation is satisfied.

By satisfying the range, a film having excellent optical properties so that a rainbow phenomenon or a mura phenomenon does not occur, may be provided, and also, a range of selection of a solvent in a post-coating process may be wider, which is thus preferred. That is, a coating layer is applied to a surface having excellent compatibility with a solvent used in the post-coating process, thereby further improving optical quality such as a viewing angle and transparency.

$$B/A \geq 1.3 \qquad \text{[Equation 1]}$$

More specifically, in Equation 1, when B/A is 1.5 or more, more specifically, B/A is 2 or more, and more specifically, B/A is 2.5 or more, a film having better optical properties may be provided, and also, a range of selection of a solvent in the post-coating process may be wider, which is thus preferred. In Equation 1, the upper limit is not limited, but specifically, for example, may be 5.0. That is, B/A may be 1.5 or more and 5.0 or less. When B/A is less than 1.3, a surface energy difference between both the surfaces is small so that a range of selection of a solvent is not substantially wide and it is difficult to apply various functional coatings, and also, when an optical adhesive layer and an opposite surface of the coating layer are laminated within the range, a visibility is good and a rainbow phenomenon and haze occurrence are minimized, and thus, the range is preferred.

More specifically, though not limited, for example, the surface energy A of the first surface may be 20 to 30 mN/m and the surface energy B of the second surface may be 30 to 50 mN/m.

In an exemplary embodiment of the present invention, the polyimide-based film may have a thickness of 10 to 500 μm, 20 to 250 μm, or 30 to 100 μm.

In an exemplary embodiment of the present invention, the polyimide-based film may have a modulus in accordance with ASTM D882 of 3 GPa or more, 4 GPa or more, or 5 GPa or more, an elongation at break of 8% or more, 12% or more, or 15% or more, a light transmittance of 5% or more or 5 to 80% as measured at 388 nm in accordance with ASTM D1746, a total light transmittance of 87% or more, 88% or more, or 89% or more as measured at 400 to 700 nm, a haze according to ASTM D1003 of 2.0% or less, 1.5% or less, or 1.0% or less, a yellow index in accordance with ASTM E313 of 5.0 or less, 3.0 or less, or 0.4 to 3.0, and a b* value of 2.0 or less, 1.3 or less, or 0.4 to 1.3.

In an exemplary embodiment of the present invention, the polyimide-based film is a polyimide-based resin, in particular, a polyimide-based resin having a polyamideimide structure.

In addition, more preferably, the polyimide-based film may be a polyamideimide-based resin including a fluorine atom and an aliphatic cyclic structure, and thus, may have excellent mechanical physical properties and a dynamic bending property.

In an exemplary embodiment of the present invention, the polyamideimide-based resin including a fluorine atom and an aliphatic cyclic structure may include a unit derived from a fluorine-based aromatic diamine, a unit derived from an aromatic dianhydride, and a unit derived from an aromatic diacid dichloride. More preferably, in an exemplary embodiment of the present invention, as the polyamideimide-based resin including a fluorine atom and an aliphatic cyclic structure, it is preferred to use a quaternary copolymer including a unit derived from a fluorine-based aromatic diamine, a unit derived from an aromatic dianhydride, a unit derived from a cycloaliphatic dianhydride, and a unit derived from an aromatic diacid dichloride, since it is more appropriate for expressing the physical properties to be desired.

In an exemplary embodiment of the present invention, as an example of the polyamideimide-based resin including a fluorine atom and an aliphatic cyclic structure, it is preferred to prepare a polyamideimide polymer by preparing an amine-terminal polyamide oligomer derived from a first fluorine-based aromatic diamine and an aromatic diacid dichloride and polymerizing a monomer derived from the amine-terminal polyamide oligomer, a second fluorine-based aromatic diamine, an aromatic dianhydride, and a cycloaliphatic dianhydride, since the object of the present invention is achieved better. The first fluorine-based aromatic diamine and the second fluorine-based aromatic diamine may be the same or different kinds. More specifically, an exemplary embodiment of the polyamideimide-based resin may include a block consisting of an amine-terminal polyamide oligomer derived from a first fluorine-based aromatic diamine and an aromatic diacid dichloride and a polyimide unit at both ends, and a content of the block may be 50% or more, based on the mass.

In an exemplary embodiment of the present invention, when the amine-terminal oligomer having an amide structure in a polymer chain by the aromatic diacid dichloride is included as the monomer of the diamine, not only optical physical properties but also in particular, mechanical strength including the modulus may be improved, and also the dynamic bending property may be further improved.

In an exemplary embodiment of the present invention, when the polyamide oligomer block is included, a mole ratio between a diamine monomer including the amine-terminal polyamide oligomer and the second fluorine-based aromatic diamine and a dianhydride monomer including the aromatic dianhydride and the cycloaliphatic dianhydride of the present invention may be 1:0.9 to 1.1, preferably 1:1. In addition, a content of an amine-terminal polyamide oligomer with respect to the entire diamine monomer is not particularly limited, but may be 30 mol % or more, preferably 50 mol % or more, and more preferably 70 mol % or more are more preferred for satisfying the mechanical physical properties, the yellow index, and the optical properties of the present invention, and also, when the polyamideimide film having a surface energy difference of the present invention is provided, selectivity of a coating solvent may be increased by diversity of solubility. In addition, a composition ratio of the aromatic dianhydride and the cycloaliphatic dianhydride is not particularly limited; however, a ratio of 30 to 80 mol %:70 to 20 mol % is preferred considering the transparency, the yellowness, and the mechanical physical properties of the present invention, but the ratio is not necessarily limited thereto.

In addition, another example of the polyamideimide-based resin including a fluorine atom and an aliphatic cyclic structure in the present invention may be a polyamideimide-based resin obtained by mixing, polymerizing, and imidizing the fluorine-based aromatic diamine, the aromatic dianhydride, the cycloaliphatic dianhydride, and the aromatic diacid dichloride. The resin has a random copolymer structure, may include a content of the aromatic diacid dichloride of 40 mole or more, preferably 50 to 80 mole, a content of the aromatic dianhydride of 10 to 50 mole, and a content of the cycloaliphatic dianhydride of 10 to 60 mole, and may be prepared by polymerization at a mole ratio of a sum of a diacid chloride and a dihydrate to the diimine monomer of 1:0.9 to 1.1. Preferably, polymerization is performed at a mole ratio of 1:1. The random polyamideimide of the present invention is somewhat different in the optical properties such as transparency, mechanical physical properties, and solvent sensitivity due to a surface energy difference as compared with the block polyamideimide resin, but may belong to the category of the present invention.

In an exemplary embodiment of the present invention, as the fluorine-based aromatic diamine component, 2,2'-bis(trifluoromethyl)-benzidine and another known aromatic diamine component may be mixed and used, but 2,2'-bis(trifluoromethyl)-benzidine may be used alone. By using the fluorine-based aromatic diamine as such, excellent optical properties may be improved, based on the mechanical physical properties required in the present invention, and the yellowness may be improved, as the polyamideimide-based film. In addition, the tensile modulus of the polyamideimide-based film may be improved to improve the mechanical strength of the hard coating film and to further improve the dynamic bending property.

The aromatic dianhydride may be at least one or a mixture of two or more of 4,4'-hexafluoroisopropylidene diphthalic anhydride (6FDA) and biphenyltetracarboxylic dianhydride (BPDA), 4,4'-oxydiphthalic dianhydride (ODPA), sulfonyl diphthalic anhydride (SO2DPA), (isopropylidenediphenoxy) bis(phthalic anhydride)(6HDBA), 4-(2,5-dioxotetrahydrofuran-3-yl)-1,2,3,4-tetrahydronaphthalene-1,2-dicarboxylic dianhydride (TDA), 1,2,4,5-benzene tetracarboxylic dianhydride (PMDA), benzophenone tetracarboxylic dianhydride (BTDA), bis(carboxylphenyl) dimethyl silane dianhydride (SiDA), bis(dicarboxyphenoxy) diphenyl sulfide dianhydride (BDSDA), but the present invention is not limited thereto.

As an example of the cycloaliphatic dianhydride, any one or a mixture of two or more selected from the group consisting of 1,2,3,4-cyclobutanetetracarboxylic dianhydride (CBDA), 5-(2,5-dioxotetrahydrofuryl)-3-methylcyclohexene-1,2-dicarboxylic dianhydride (DOCDA), bicyclo[2.2.2]oct-7-en-2,3,5,6-tetracarboxylic dianhydride (BTA), bicyclooxtene-2,3,5,6-tetracarboxylic dianhydride (BODA), 1,2,3,4-cyclopentanetetracarboxylic dianhydride (CPDA), 1,2,4,5-cyclohexanetetracarboxylic dianhydride (CHDA), 1,2,4-tricarboxy-3-methylcarboxycyclopentane dianhydride (TMDA), 1,2,3,4-tetracarboxycyclopentane dianhydride (ICDA), and derivatives thereof may be used.

In an exemplary embodiment of the present invention, when the amide structure is formed in the polymer chain by the aromatic diacid dichloride, not only optical physical properties but also in particular, mechanical strength including the modulus may be greatly improved, and also the dynamic bending property may be further improved.

As the aromatic diacid dichloride, a mixture of two or more selected from the group consisting of isophthaloyl dichloride (IPC), terephthaloyl dichloride (TPC), [1,1'-Biphenyl]-4,4'-dicarbonyl dichloride (BPC), 1,4-naphthalene dicarboxylic dichloride (NPC), 2,6-naphthalene dicarboxylic dichloride (NTC), 1,5-naphthalene dicarboxylic dichloride (NEC), and derivatives thereof may be used, but is not limited thereto.

A weight average molecular weight of the polyimide resin in the present invention is not particularly limited, but may be 200,000 g/mol or more, preferably 300,000 g/mol or more, and more preferably 200,000 to 500,000 g/mol. In addition, a glass transition temperature is not limited, but may be 300 to 400° C., more specifically 330 to 380° C. Within the range, since a film having a high modulus, an excellent mechanical strength, excellent optical physical properties, and less curling may be provided, the range is preferred, but the present invention is not necessarily limited thereto.

Hereinafter, a method of preparing the polyimide-based film will be illustrated.

In an exemplary embodiment of the present invention, the polyimide-based film may be prepared by applying a "polyimide-based resin solution" including a polyimide-based resin and a solvent on a substrate, and performing drying or drying and stretching. That is, the polyimide-based film may be prepared by a solution casting method.

As an example, the polyimide-based film may be prepared by including: reacting a fluorine-based aromatic diamine and an aromatic diacid dichloride to prepare an oligomer, reacting the prepared oligomer with the fluorine-based aromatic diamine, an aromatic dianhydride, and a cycloaliphatic dianhydride to prepare a polyamic acid solution, imidizing the polyamic acid solution to prepare a polyamideimide resin, and applying a polyamideimide solution in which a polyamideimide resin is dissolved in an organic solvent to form a film.

Hereinafter, each step will be described in more detail, taking a case in which a block polyamideimide film is prepared as an example.

The step of preparing an oligomer may include reacting the fluorine-based aromatic diamine and the aromatic diacid dichloride and purifying and drying the obtained oligomer. In this case, the fluorine-based aromatic diamine may be introduced at a mole ratio of 1.01 to 2 with respect to the aromatic diacid dichloride to prepare an amine-terminal polyamide oligomer monomer. A molecular weight of the oligomer monomer is not particularly limited, but for example, when the weight average molecular weight is in a range of 1000 to 3000 g/mol, better physical properties may be obtained.

In addition, it is preferred to use an aromatic carbonyl halide monomer such as terephthaloyl chloride or isophthaloyl chloride, not terephthalic ester or terephthalic acid itself for introducing an amide structure, and this is, though not clear, considered to influence the physical properties of the film by a chlorine element.

Next, the step of preparing a polyamic acid may be performed by a solution polymerization reaction in which the prepared oligomer with the fluorine-based aromatic diamine, the aromatic dianhydride, and the cycloaliphatic dianhydride are reacted in an organic solvent. Here, the organic solvent used for the polymerization reaction may be, as an example, any one or two or more polar solvents selected from dimethylacetamide (DMAc), N-methyl-2-pyrrolidone (NMP), dimethylformamide (DMF), dimethylsulfoxide (DMSO), ethylcellosolve, methylcellosolve, acetone, ethylacetate, m-cresol, and the like.

Next, a step of performing imidization to prepare a polyamideimide resin may be performed by chemical imidization, and more preferably, a polyamic acid solution is chemically imidized using pyridine and an acetic anhydride. Subsequently, imidization is performed using an imidization catalyst and a dehydrating agent at a low temperature of 150° C. or lower, preferably 100° C. or lower, and more specifically 50 to 150° C.

By the method as such, uniform mechanical physical properties may be imparted to the entire film as compared with the case of an imidization reaction by heat at a high temperature.

As the imidization catalyst, any one or two or more selected from pyridine, isoquinoline and β-quinoline may be used. In addition, as the dehydrating agent, any one or two or more selected from an acetic anhydride, a phthalic anhydride, a maleic anhydride, and the like may be used, but is not necessarily limited thereto.

In addition, an additive such as a flame retardant, an adhesion improver, inorganic particles, an antioxidant, a UV inhibitor, and a plasticizer may be mixed with the polyamic acid solution to prepare the polyamideimide resin.

In addition, after imidization, the resin is purified using a solvent to obtain a solid content, which is dissolved in a solvent to obtain a polyamideimide solution. The solvent may include N,N-dimethyl acetamide (DMAc) and the like, but is not limited thereto.

The step of forming a film from the polyamideimide solution is performed by applying the polyamideimide solution on a substrate, and then drying the solution in a drying step divided into a dry area. In addition, stretching may be performed before or after the drying, and a heat treatment step may be further performed after the drying or stretching step. As the substrate, for example, glass, stainless, a film, or the like may be used, but is not limited thereto. Application may be performed by a die coater, an air knife, a reverse roll, spraying, a blade, casting, gravure, spin coating, and the like.

More specifically, a method of producing a polyimide-based film according to an exemplary embodiment of the present invention having different surface energies from each other on both the surfaces by forming a polyamideimide solution into a film will be described.

In an exemplary embodiment of the present invention, the polyimide-based film may be produced by a solution casting method. That is, the polyimide-based film may be prepared from a composition for forming a polyimide-based film.

The composition for forming a polyimide-based film may include the polyimide-based resin and an organic solvent. Otherwise, the composition may include the polyamideimide-based resin and an organic solvent.

The organic solvent is not particularly limited as long as it may dissolve a polyimide resin or a polyamideimide resin; however, for example, may be any one or a mixture of two or more selected from dimethylacetamide (DMAc), N-methyl-2-pyrrolidone (NMP), dimethylformamide (DMF), dimethylsulfoxide (DMSO), acetone, ethylacetate, m-cresol, and the like, but is not limited thereto.

According to the exemplary embodiment, a method of forming a film using the composition for forming a polyimide-based film is not particularly limited, but for example, the composition for forming a polyimide-based film may be applied on a substrate and dried to form a film. As the substrate, for example, glass, ceramic, a polymer film, or the like may be used, but is not limited thereto. For application, any one or more methods selected from a spin coating method, a dipping method, a spraying method, a die coating method, a bar coating method, a roll coater method, a meniscus coating method, a flexo printing method, a screen printing method, a bead coating method, an airknife coating method, a reverse roll coating method, a blade coating method, a casting coating method, a gravure coating method, and the like, may be used, but is not limited thereto.

More specifically, for example, the composition for forming a polyimide-based film may be coated on a carrier film such as a polyethyleneterephthalate film or a polyimide film and dried, and then the dried transparent polyimide-based film and the carrier film may be wound around a roll, or alternatively, the composition may be coated on a metal belt such as a stainless belt, instead of the carrier film, dried, and then wound. Next, the roll having the film wound thereon is moved to tenter equipment and only a transparent polyimide-based film is pulled in a pin of the tenter while peeling off the carrier film to proceed with heat treatment in the tenter equipment, thereby performing production. Here, the first surface of the polyimide-based film produced may mean a surface in contact with air during solution casting, and the second surface may mean a surface in contact with a substrate.

Next, a method of adjusting the surface energy of the first surface and the second surface of the present invention will be described.

The surface energy of the present invention may be achieved by adjusting a surface roughness of both the surfaces. In a method of adjusting the surface roughness, unevenness of a substrate having an adjusted surface roughness may be adjusted to make a difference in a roughness with the surface in contact with air. In addition, in order to further maximize or decrease a roughness difference of a film having an adjusted roughness between the surface in contact with the substrate and the surface in contact with air, stretching or shrinkage stretching may be performed during heat treatment in the tenter equipment, and heat treatment temperature and time may be adjusted to adjust a surface roughness. More specifically, for example, the surface roughness (Ra) of the substrate is adjusted, thereby imparting a surface energy difference between a substrate surface attached to the substrate and an air surface. As an example, the surface roughness of the substrate or a conveyor belt is adjusted to 0.02 μm or less, thereby increasing the surface energy of polyimide in contact with the substrate surface to further increase the surface energy difference from the air surface.

Specifically, for example, in the state in which the surface roughness of the substrate is adjusted to 0.02 μm or less, the composition for forming a polyimide-based film is cast on the substrate, and dried by a drying process at 80 to 150° C. for 5 to 20 minutes to produce a dried transparent polyimide-based film, and the dried film is peeled off from a stainless belt. Thereafter, when the peeled transparent polyimide-based film is produced by pulling the film in the pin of the tenter and heat-treated at 120 to 300° C. for 5 to 20 minutes in the tenter equipment, a ratio of surface energy between the surface in contact with the substrate surface and the air surface may be adjusted to 1.3 or more.

<Window Cover Film>

Another exemplary embodiment of the present invention provides a window cover film including: the polyimide-based film described above; and a coating layer formed on the polyimide-based film.

When the coating layer is laminated on the polyimide-based film having a certain range of a surface hardness change rate, a window cover film having a significantly improved visibility may be provided.

In an exemplary embodiment of the present invention, the window cover film may satisfy the physical properties of a light transmittance of 3% or more as measured at 388 nm according to ASTM D1746, a total light transmittance of 87% or more, 88% or more, or 89% or more as measured at 400 to 700 nm, a haze according to ASTM D1003 of 1.5% or less, 1.2% or less, or 1.0% or less, a yellowness according to ASTM E313 of 4.0 or less, 3.0 or less, or 2.0 or less, and a b* value of 2.0 or less, 1.5 or less, or 1.2 or less.

According to an exemplary embodiment of the present invention, the coating layer is for imparting functionality of the window cover film, and may be variously applied depending on its purpose.

Specifically, for example, the coating layer may include any one or more layers selected from a hard coating layer, a restoration layer, an shock spread layer, a self-cleaning layer, an anti-fingerprint layer, an anti-scratch layer, a low-refractive layer, an shock absorption layer, and the like, but is not limited thereto.

Even in the case in which various coating layers as described above are formed on the polyimide-based film, a window cover film having excellent display quality, high optical properties, and a significantly reduced rainbow phenomenon, may be provided.

In an exemplary embodiment of the present invention, specifically, the coating layer may be formed on one surface or both the surfaces of the polyimide-based film. For example, the coating layer may be disposed on an upper surface of the polyimide-based film, or disposed on each of an upper surface and a lower surface of the polyimide-based film. The coating layer may protect the polyimide-based film having excellent optical and mechanical properties from external physical or chemical damage.

In an exemplary embodiment of the present invention, the coating layer may have a solid content of 0.01 to 200 g/m$^2$, based on a total area of the polyimide-based film. Preferably, the solid content may be 20 to 200 g/m$^2$, based on the total area of the polyimide-based film. By providing the basis weight described above, surprisingly, the film may not cause a rainbow phenomenon while maintaining functionality to implement an excellent visibility.

In an exemplary embodiment of the present invention, specifically, the coating layer may be formed by applying the coating layer in the state of a composition for forming a coating layer including a coating solvent on the polyimide-based film. The coating solvent is not particularly limited, but preferably, may be a polar solvent. For example, the polar solvent may be any one or more solvents selected from an ether-based solvent, a ketone-based solvent, an alcohol-based solvent, an amide-based solvent, a sulfoxide-based solvent, an aromatic hydrocarbon-based solvent, and the like. Specifically, the polar solvent may be any one or more solvents selected from dimethylacetamide (DMAc), N-methyl-2-pyrrolidone (NMP), dimethylformamide (DMF), dimethylsulfoxide (DMSO), acetone, ethylacetate, propylene glycol methyl ether, m-cresol, methanol, ethanol, isopropanol, butanol, 2-methoxyethanol, methylcellosolve, ethylcellosolve, methyl ethyl ketone, methyl butyl ketone, methyl isobutyl ketone, methyl phenyl ketone, diethyl ketone, dipropyl ketone, cyclohexanone, hexane, heptane, octane, benzene, toluene, xylene, and the like.

In an exemplary embodiment of the present invention, as a method of forming the coating layer by applying the composition for forming a coating layer on the polyimide-based film, any one or more methods selected from a spin coating method, a dipping method, a spraying method, a die coating method, a bar coating method, a roll coater method, a meniscus coating method, a flexo printing method, a screen printing method, a bead coating method, an air knife coating method, a reverse roll coating method, a blade coating method, a casting coating method, a gravure coating method, and the like, may be used, but is not limited thereto.

Preferably, in an exemplary embodiment of the present invention, the coating layer may be a hard coating layer. The hard coating layer may include any one or more selected from organic materials and inorganic materials. For example, the organic material includes carbon, and may include any one or more selected from carbon mainly, and nonmetallic elements such as hydrogen, oxygen, and nitrogen. The inorganic material refers to a material other than the organic material, and may include any one or more selected from metal elements such as alkali earth metals, alkali metals, transition metals, post transition metals, and metalloids. As an example, the inorganic material may include carbon dioxide, carbon monoxide, diamond, carbonate, and the like, as a subject for exception.

In an exemplary embodiment of the present invention, the hard coating layer may be a single layer of an organic material layer or an inorganic material layer, or a mixed layer of an organic material and an inorganic material, and though it is not particularly limited, preferably, may include 10 to 90 wt % of the organic material and 10 to 90 wt % of the inorganic material. Preferably, the hard coating layer may include 40 to 80 wt % of the organic material and 20 to 60 wt % of the inorganic material. Even in the case in which the hard coating layer including the organic material and the inorganic material is formed as described above, bonding with the polyimide-based film is excellent, no distortion by light occurs, and in particular, an effect of improving a rainbow phenomenon is excellent.

According to an exemplary embodiment of the present invention, though not particularly limited, the hard coating layer may be a layer including, for example, any one or more polymers selected from an acryl-based polymer, a silicon-based polymer, an epoxy-based polymer, an urethane-based polymer, and the like.

Specifically, the hard coating layer prevents deterioration of optical properties when being formed on the polyimide-based film, and may be a layer formed from a composition for forming a coating layer including an epoxysilane resin for improving a surface hardness. Specifically, the epoxysilane resin may be a siloxane resin including an epoxy group. The epoxy group may be a cyclic epoxy group, an aliphatic epoxy group, an aromatic epoxy group, or a mixture thereof. The siloxane resin may be a polymer compound in which a silicon atom and an oxygen atom form a covalent bond.

Preferably, for example, the epoxy siloxane resin may be a silsesquioxane resin. Specifically, the epoxy siloxane resin may be a compound in which a silicon atom of the silsesquioxane resin is directly substituted by an epoxy group or the substituent on the silicon atom is substituted by an epoxy group. As a non-limiting example, the epoxy siloxane resin may be a silsesquioxane resin substituted by a 2-(3,4-epoxycyclohexyl) group or a 3-glycidoxy group.

The epoxy siloxane resin may be produced from alkoxysilane having an epoxy group alone or hydrolysis and condensation reactions between alkoxysilane having an epoxy group and another kind of alkoxysilane, in the presence of water. In addition, the epoxysilane resin may be formed by polymerizing a silane compound including an epoxycyclohexyl group.

For example, the alkoxysilane compound having an epoxy group may be any one or more selected from 2-(3,4-epoxycyclohexyl)ethyltrimethoxysilane, 2-(3,4-epoxycyclohexyl)ethyltriethoxysilane, 3-glycidoxypropyltrimethoxysilane, and the like.

In an exemplary embodiment of the present invention, the epoxy siloxane resin may have a weight average molecular weight of 1,000 to 20,000 g/mol, but is not limited thereto. When the epoxy siloxane resin has the weight average molecular weight in the above range, it has an appropriate viscosity, thereby improving flowability, coatability, curing reactivity, and the like of the composition for forming a coating layer, and improving the surface hardness of the hard coating layer.

In an exemplary embodiment of the present invention, the epoxy siloxane resin may be included at 20 to 65 wt %, preferably to 60 wt %, based on a total weight of the composition for forming a coating layer. When the epoxy siloxane resin is included within the above range, the surface hardness of the hard coating layer may be improved, and uniform curing may be derived to prevent physical defects such as cracks due to partial overcuring.

In an exemplary embodiment of the present invention, the composition for forming a coating layer may further include a crosslinking agent and an initiator.

Specifically, the crosslinking agent is not particularly limited as long as it may form a crosslink with the epoxy siloxane resin to solidify the composition for forming a coating layer and improve a hardness of the hard coating layer, but the crosslinking agent may be, for example, any one or more selected from (3,4-epoxycyclohexyl)methyl-3',4'-epoxycyclohexanecarboxylate, digylcidyl 1,2-cyclohexanedicarboxylate, 2-(3,4-epoxycyclohexyl-5,5-spiro-3,4-epoxy)cyclohexane-meta-dioxane, bis(3,4-epoxycyclohexylmethyl)adipate), bis(3,4-epoxy-6-methylcyclohexyl)adipate, 3,4-epoxy-6-methylcyclohexylmethyl-3',4'-epoxy-6'-methylcyclohexanecarboxylate, 1,4-cyclohexanedimethanol bis(3,4-epoxycyclohexanecarboxylate), ethylenebis(3,4-epoxycyclohexanecarboxylate), 3,4-epoxycyclohexylmethyl (meth)acrylate, bis(3,4-epoxycyclohexylmethyl)adipate, 4-vinylcyclohexenedioxide, vinylcyclohexenemonoxide, 1,4-cyclohexanedimethanol diglycidyl ether, 2,2'-((1-methylethylidene)bis(cyclohexane-4,1-diyloxymethylene)) bisoxirane, and the like. Preferably, the crosslinking agent may be any one or more selected from (3,4-epoxycyclohexyl)methyl-3',4'-epoxycyclohexanecarboxylate, bis(3,4-epoxycyclohexylmethyl)adipate), and the like including a compound in which two 3,4-epoxycyclohexyl groups are connected.

In an exemplary embodiment of the present invention, the content of the crosslinking agent is not particularly limited, and for example, may be 5 to 150 parts by weight, based on 100 parts by weight of the epoxy siloxane resin. In addition, according to an exemplary embodiment of the present invention, the crosslinking agent may be included at 3 to 30 wt %, preferably 5 to 20 wt %, based on the total weight of the composition for forming a coating layer. Within the range, the coatability and curing reactivity of the composition for forming a coating layer may be improved.

In an exemplary embodiment of the present invention, the initiator may be a photoinitiator or a thermal initiator. Preferably, the initiator may be a photoinitiator, and for example, the photoinitiator may include a photo-cationic initiator. The photo-cationic initiator may initiate polymerization of the epoxy siloxane resin and an epoxy-based monomer.

Specifically, the photo-cationic initiator may be any one or more selected from onium salts, organic metal salts, and the like, but is not limited thereto. For example, the photo-cationic initiator may be any one or more selected from a diaryliodonium salt, a triarylsulfonium salt, an aryldiazonium salt, an iron-arene complex, and the like, but is not limited thereto.

In an exemplary embodiment of the present invention, the content of the photoinitiator is not particularly limited, and for example, may be 1 to 15 parts by weight, based on 100 parts by weight of the epoxy siloxane resin. In addition, according to an exemplary embodiment of the present invention, the photoinitiator may be included at 0.1 to 10 wt %, preferably 0.3 to 5 wt %, based on the total weight of the composition for forming a coating layer. When the content of the photoinitiator is within the above range, curing efficiency of the hard coating layer is excellent and deterioration of the physical properties due to residual components after curing may be prevented.

In an exemplary embodiment of the present invention, the composition for forming a coating layer may further include any one or more additives selected from fillers, slip agents, photostabilizers, thermal polymerization prohibition agents, leveling agents, lubricants, antifoulants, thickeners, surfactants, antifoaming agents, anti-static agents, dispersants, initiators, coupling agents, antioxidants, UV stabilizers, colorants, and the like, but it not limited thereto.

The hard coating layer may further include inorganic particles for imparting hardness. The inorganic particles may be preferably silica, and more preferably surface-treated silica, but is not limited thereto. Here, surface treatment may be inclusion of a functional group capable of reacting with the crosslinking agent described above.

According to an exemplary embodiment, the inorganic particles may have an average particle diameter of 1 to 500 nm, and preferably 10 to 300 nm, but is not limited thereto.

When a hard coating layer described above is formed on the conventional polyimide-based film, a rainbow phenomenon was not able to be avoided by distortion of light. However, the polyimide-based film according to the present invention hardly causes a rainbow phenomenon even in the case in which the hard coating layer is formed, and may implement an excellent visibility.

In an exemplary embodiment of the present invention, the window cover film may further include a substrate layer. The substrate layer may be formed on the other surface of the polyimide-based film on which the coating layer is not formed.

In an exemplary embodiment of the present invention, the polyimide-based film may be laminated on the substrate layer after being produced into a film, or may be laminated after applying a polyamic acid resin composition which is a precursor of the polyimide-based film to be coated, but is not particularly limited as long as it may form a lamination configuration described above.

In an exemplary embodiment of the present invention, the substrate layer is not particularly limited as long as it is a substrate film of a commonly used window cover film, but for example, may include any one or more selected from an ester-based polymer, a carbonate-based polymer, a styrene-based polymer, an acryl-based polymer, and the like. Specifically, for example, the substrate layer may include any one or more selected from polyethylene terephthalate, polyethylene naphthalate, polybutylene terephthalate, polybutylene naphthalate, polycarbonate, polystyrene, polymethylmetyacrylate, and the like, but is not limited thereto.

In an exemplary embodiment of the present invention, the substrate layer may be a single layer or a multiple layer in which two or more layers are laminated. Specifically, the substrate layer may include an optical adhesive layer on an interface of two or more substrate films and be laminated.

According to an exemplary embodiment of the present invention, the substrate layer may have a thickness of 50 to 300 μm. The thickness may be preferably 100 to 300 μm, and more preferably 150 to 250 μm. By having the thickness described above, the substrate layer may satisfy mechanical physical properties, and also significantly reduce a distortion phenomenon of light, when laminating the polyimide-based film.

In an exemplary embodiment of the present invention, specifically, for example, the optical adhesive layer may include any one or more selected from an optical clear adhesive (OCA), an optical clear resin (OCR), a pressure sensitive adhesive (PSA), and the like, but is not limited thereto.

In an exemplary embodiment of the present invention, the window cover film may further include a second optical adhesive layer on an interface between the substrate layer and the polyimide-based film.

Specifically, the second optical adhesive layer formed on the interface between the substrate layer and the polyimide-based film may be the same or different material as/from the optical adhesive layer in the substrate layer described above, and for example, may be formed to a thickness of 20 to 120 μm. Preferably, the thickness may be 20 to 80 μm. When the thickness is formed within the above range, the window cover film may implement overall excellent optical properties and a light distortion improvement effect.

In an exemplary embodiment of the present invention, the window cover film may have a high surface hardness, have excellent flexibility, be lighter than tempered glass, and have excellent durability against deformation, and thus, is excellent as a window substrate on the outermost surface of a flexible display panel.

Another exemplary embodiment of the present invention provides a display device including: a display panel and the window cover film described above formed on the display panel.

In an exemplary embodiment of the present invention, the display device is not particularly limited as long as it belongs to a field requiring excellent optical properties, and may be provided by selecting a display panel appropriate therefor. Preferably, the window cover film may be applied to a flexible display device, and specifically, for example, may be included and applied to any one or more image displays selected from various image displays such as a liquid crystal display, an electroluminescence display, a plasma display, and a field emission display device, but is not limited thereto.

The display device including the window cover film of the present invention described above has excellent display quality to be displayed and significantly decreased distortion caused by light, and thus, may have a significantly improved rainbow phenomenon in which iridescent stain occurs and minimize user's eye strain with an excellent visibility.

Hereinafter, the present invention will be described in more detail with reference to the Examples and Comparative Examples. However, the following Examples and Comparative Examples are only an example for describing the present invention in detail, and do not limit the present invention in any way.

1) Surface Energy

The surface energy was calculated by using equipment from KRUSS (KRUSS DSA100S), deriving a contact value when applying water by a sessile drop method and a contact value when applying diiodomethane as an average value of three, and using a OWRK method (Owens, Wendt, Rabel, and Kaelble) to apply the values to the following equation.

$$\sigma_{st} = \sigma_s + \sigma_t - 2(\sqrt{\sigma_s^D \cdot \sigma_t^D} + \sqrt{\sigma_s^P \cdot \sigma_t^P})$$

2) Modulus/Elongation at Break

According to ASTM D882, the elongation at break was measured using UTM 3365 available from Instron, with the condition of pulling a polyamideimide film having a length of 50 mm and a width of 10 mm at 50 mm/min at 25° C.

The thickness of the film was measured and the value was input to the instrument. The unit of the modulus was GPa and the unit of the elongation at break was %.

3) Light Transmittance

In accordance with the standard of ASTM D1746, a total light transmittance was measured at the entire wavelength area of 400 to 700 nm using a spectrophotometer (from Nippon Denshoku, COH-400) and a single wavelength light transmittance was measured at 388 nm using UV/Vis (Shimadzu, UV3600), on a film having a thickness of 50 μm. The unit was %.

4) Haze

In accordance with the standard of ASTM D1003, the haze was measured based on a film having a thickness of 50 μm, using a spectrophotometer (from Nippon Denshoku, COH-400). The unit was %.

5) Yellow Index (YI) and b* Value

In accordance with the standard of ASTM E313, the yellowness and the b* value were measured based on a film having a thickness of 50 μm, using a colorimeter (from HunterLab, ColorQuest XE).

6) Weight Average Molecular Weight (Mw) and Polydispersity Index (PDI)

The weight average molecular weight and the polydispersity index of the produced films were measured as follows.

First, a film sample was dissolved in a DMAc eluent containing 0.05 M LiBr and used as a sample.

Measurement was performed by using GPC (Waters GPC system, Waters 1515 isocratic HPLC Pump, Waters 2414 Refractive Index detector), connecting Olexis, polypore, and mixed D columns as a GPC column, using a DMAc solution as a solvent, and using polymethylmethacrylate (PMMA STD) as a standard, and analysis was performed at a flow rate of 1 ml/min at 35° C.

7) Water Contact Angle

The water contact angle was measured using a contact angle meter (KRUSS, MSA) by dropping water on a surface of a coating layer surface of the film.

8) Pencil Hardness

For the films produced in Examples and Comparative Examples, according to JIS K5400, a line of 20 mm was drawn at a rate of 50 mm/sec on the film using a load of 750 g, this operation was repeated 5 times or more, and the pencil hardness was measured based on the case in which there were one or fewer scratches.

PREPARATION EXAMPLE 1

Preparation of Composition for Forming Polyimide-Based Film

Terephthaloyl dichloride (TPC) and 2,2'-bis(trifluoromethyl)-benzidine (TFMB) were added to a mixed solution of dichloromethane and pyridine in a reactor, and stirring was performed at 25° C. for 2 hours under a nitrogen atmosphere. Here, a mole ratio of TPC:TFMB was 300:400, and a solid content was adjusted to 10 wt %. Thereafter, the reactant was precipitated in an excessive amount of methanol and filtered to obtain a solid content, which was dried under vacuum at 50° C. for 6 hours or more to obtain an oligomer, and the prepared oligomer had a formula weight (FW) of 1670 g/mol.

N,N-dimethylacetamide (DMAc), 100 mol of the oligomer, and 28.6 mol of 2,2'-bis(trifluoromethyl)-benzidine (TFMB) were added to the reactor and sufficient stirring was performed. After confirming that the solid raw material was completely dissolved, fumed silica (surface area of 95 $m^2$/g, <1 μm) was added to DMAc at a content of 1000 ppm relative to the solid content, and added to the reactor after being dispersed using ultrasonic waves. 64.3 mol of cyclobutanetetracarboxylic dianhydride (CBDA) and 64.3 mol of 4,4'-hexafluoroisopropylidene diphthalic anhydride (6FDA) were subsequently added, sufficient stirring was performed, and the mixture was polymerized at 40° C. for 10 hours. Here, the solid content was 12%. Subsequently, each of pyridine and acetic anhydride was added to the solution at 2.5-fold relative to the total content of dianhydride, and stirring was performed at 60° C. for 12 hours.

After the polymerization was finished, the polymerization solution was precipitated in an excessive amount of methanol and filtered to obtain a solid content, which was dried under vacuum at 50° C. for 6 hours to obtain polyamide-imide powder. The powder was diluted and dissolved at 20 wt % in DMAc to prepare a polyimide-based resin solution.

EXAMPLE 1

The composition for forming a polyimide-based film prepared from Preparation Example 1 was coated on a PET substrate film having a surface roughness of 0.017 μm, the coated substrate was dried under a condition of a maximum temperature of 140° C. and a residence time of 6 minutes, and the film was wound with a PET substrate film in a roll type. The roll having the film wound thereon was moved to tenter equipment, and only a dried polyamideimide film was pull in a pin of the tenter equipment while peeling off the PET substrate film and was heat-treated under a condition of a maximum temperature of 280° C. for 6 minutes to produce a polyamideimide film having a thickness of 50 μm.

The produced film had a total light transmittance of 89%, a haze of 0.53%, a yellow index (YI) of 2.1, a modulus of 6.5 GPa, and an elongation at break of 21%.

In addition, a surface energy of the produced film was measured and is shown in the following Table 1.

EXAMPLE 2

The composition for forming a polyimide-based film produced from Preparation Example 1 was cast on a SUS belt having a surface roughness of 0.007 μm and was dried under a condition of a maximum temperature of 140° C. for a residence time of 6 minutes, and the film was pulled in the pin of the tenter equipment while a dried film was peeled off from the belt and then was heat-treated under a condition of a maximum temperature of 280° C. for 6 minutes to produce a polyamideimide film having a thickness of 50 μm.

The produced film had a total light transmittance of 89%, a haze of 0.57%, a yellow index (YI) of 2.2, a modulus of 6.6 GPa, and an elongation at break of 26%.

In addition, a surface energy of the produced film was measured and is shown in the following Table 1.

EXAMPLE 3

The composition for forming a polyimide-based film prepared from Preparation Example 1 was coated on a PET substrate film having a surface roughness of 0.020 μm, the coated substrate was dried under a condition of a maximum temperature of 140° C. and a residence time of 6 minutes, and the film was wound with a PET substrate film in a roll type. The roll having the film wound thereon was moved to tenter equipment, and only a dried polyamideimide film was pull in a pin of the tenter equipment while peeling off the PET substrate film and was heat-treated under a condition of a maximum temperature of 280° C. for 6 minutes to produce a polyamideimide film having a thickness of 50 μm.

The produced film had a total light transmittance of 88%, a haze of 0.8%, a yellow index (YI) of 2.2, a modulus of 6.4 GPa, and an elongation at break of 19%.

In addition, a surface energy of the produced film was measured and is shown in the following Table 1.

COMPARATIVE EXAMPLE 1

The composition for forming a polyimide-based film prepared from Preparation Example 1 was coated on a PET substrate film having a surface roughness of 0.056 μm, the coated substrate was dried under a condition of a maximum temperature of 140° C. and a residence time of 6 minutes, and the film was wound with a PET substrate film in a roll type. The roll having the film wound thereon was moved to tenter equipment, and only a dried polyamideimide film was pull in a pin of the tenter equipment while peeling off the PET substrate film and was heat-treated under a condition of a maximum temperature of 280° C. for 6 minutes to produce a polyamideimide film having a thickness of 50 μm.

The produced film had a total light transmittance of 87%, a haze of 1.5%, a yellow index (YI) of 2.2, a modulus of 6.5 GPa, and an elongation at break of 23%.

In addition, a surface energy of the produced film was measured and is shown in the following Table 1.

TABLE 1

| | Example 1 | Example 2 | Example 3 | Comparative Example 1 |
|---|---|---|---|---|
| Surface energy (A) of first surface (mN/m) | 25.83 | 27.34 | 26.21 | 25.70 |
| Surface energy (B) of second surface (mN/m) | 39.87 | 54.35 | 34.14 | 28.87 |
| B/A | 1.54 | 1.99 | 1.30 | 1.12 |
| Water contact angle of first surface | 96.22 | 95.10 | 95.67 | 96.34 |
| Water contact angle of second surface | 81.05 | 70.24 | 86.04 | 90.24 |
| Surface roughness Ra (μm) of substrate | 0.017 | 0.007 | 0.020 | 0.056 |

As shown in Table 1, It was confirmed in Examples 1 to 3 that a surface energy difference between both the surfaces was 1.3 or more. In addition, as in Examples 1 to 3, within the range of B/A≥1.3, it was confirmed that selectivity to various solvents was good, an visibility after forming a coating layer was good, and occurrence of a rainbow phenomenon or a haze was minimized. As in Comparative Example 1, within the range of B/A=1.12, it was confirmed that when the coating layer was formed using the same coating composition as the Examples, a rainbow phenomenon occurred and a haze was further increased.

Since the polyimide-based film according to the present invention has different surface energies from each other on both the surfaces, a polyimide-based film allowing various applications regardless of the kind of solvent used in a post-coating process may be provided.

The polyimide-based film according to the present invention may significantly improve a rainbow phenomenon.

The window cover film according to the present invention may have an excellent visibility and reduce a rainbow phenomenon in which iridescent stains occur on a display unit, or the like, even when a coating layer is formed on the polyimide-based film.

In addition, the polyimide-based film and the window cover film including the same according to the present invention may be applied to various display fields with excellent optical properties and visibility.

Hereinabove, although the present invention has been described by specific matters, limited exemplary embodiments, and drawings, they have been provided only for assisting the entire understanding of the present invention, and the present invention is not limited to the exemplary embodiments, and various modifications and changes may be made by those skilled in the art to which the present invention pertains from the description.

Therefore, the spirit of the present invention should not be limited to the above-described exemplary embodiments, and the following claims as well as all modified equally or equivalently to the claims are intended to fall within the scope and spirit of the invention.

What is claimed is:

1. A polyimide-based film having different surface energies from each other on both surfaces, wherein when a surface energy of a first surface having a relatively low surface energy is A, and a surface energy of a second surface having a relatively high surface energy is B, the following equation is satisfied:

$$B/A \geq 1.3. \qquad \text{[Equation 1]}$$

wherein the polyimide-based film comprises a polyamideimide-based resin that is a copolymer, the copolymer comprising:
   a unit consisting of an amine-terminal polyamide oligomer derived from a first fluorine-based diamine and an aromatic diacid dichloride;
   a unit derived from a second fluorine-based aromatic diamine;
   a unit derived from an aromatic dianhydride; and
   a unit derived from a cycloaliphatic dianhydride,
   wherein a content of the unit consisting of an amine-terminal polyamide oligomer is 50% or more, based on mass; and
wherein the polyimide-based film has a modulus in accordance with ASTM D882 of 3 GPa or more, an elongation at break of 8% or more, a light transmittance of 5% or more as measured at 388 nm in accordance with ASTM D1746, a total light transmittance of 87% or more as measured at 400 to 700nm, a haze of 2.0% or less, a yellow index of 5.0 or less, and a b* value of 2.0 or less.

2. The polyimide-based film of claim 1, wherein in Equation 1, B/A is 1.5 or more.

3. The polyimide-based film of claim 1, wherein the surface energy A of the first surface is 20 to 30 mN/m and the surface energy B of the second surface is 30 to 50 mN/m.

4. The polyimide-based film of claim 1, wherein the polyimide-based film is produced by a solution casting method, the first surface of both surfaces is a surface in contact with air during the solution casting, and the second surface is a surface in contact with a substrate.

5. The polyimide-based film of claim 4, wherein a surface energy difference between the first surface and the second surface is adjusted by adjusting a surface roughness (Ra) of the substrate so that the surface energies of the first surface and the second surface are different.

6. The polyimide-based film of claim 5, wherein the surface roughness of the substrate is adjusted to 0.02 µm or less to adjust the surface roughness of the second surface to 0.02 µm or less.

7. The polyimide-based film of claim 1, wherein the polyimide-based film has a thickness of 30 to 110 µm.

8. A window cover film comprising:
   the polyimide-based film of claim 1; and
   a coating layer formed on one surface or both surface of the polyimide-based film.

9. The window cover film of claim 8, wherein the coating layer is any one or more selected from a hard coating layer, an antistatic layer, an anti-fingerprint layer, an antifouling layer, an anti-scratch layer, a low-refractive layer, an anti-reflective layer, and shock absorption layer.

10. A flexible display panel comprising the polyimide-based film of claim 1.

11. The polyimide-based film of claim 1, wherein the polyimide-based film consists of a polyamideimide resin and optionally one or more additives selected from the group consisting of a flame retardant, an adhesion improver, an antioxidant, a UV inhibitor, and a plasticizer.

12. The polyimide-based film of claim 1, wherein the polyamideimide-based resin is a quaternary copolymer.

* * * * *